L. R. EWART.
HEADLIGHT CONTROLLER FOR VEHICLES.
APPLICATION FILED APR. 24, 1917.
1,265,894.
Patented May 14, 1918.
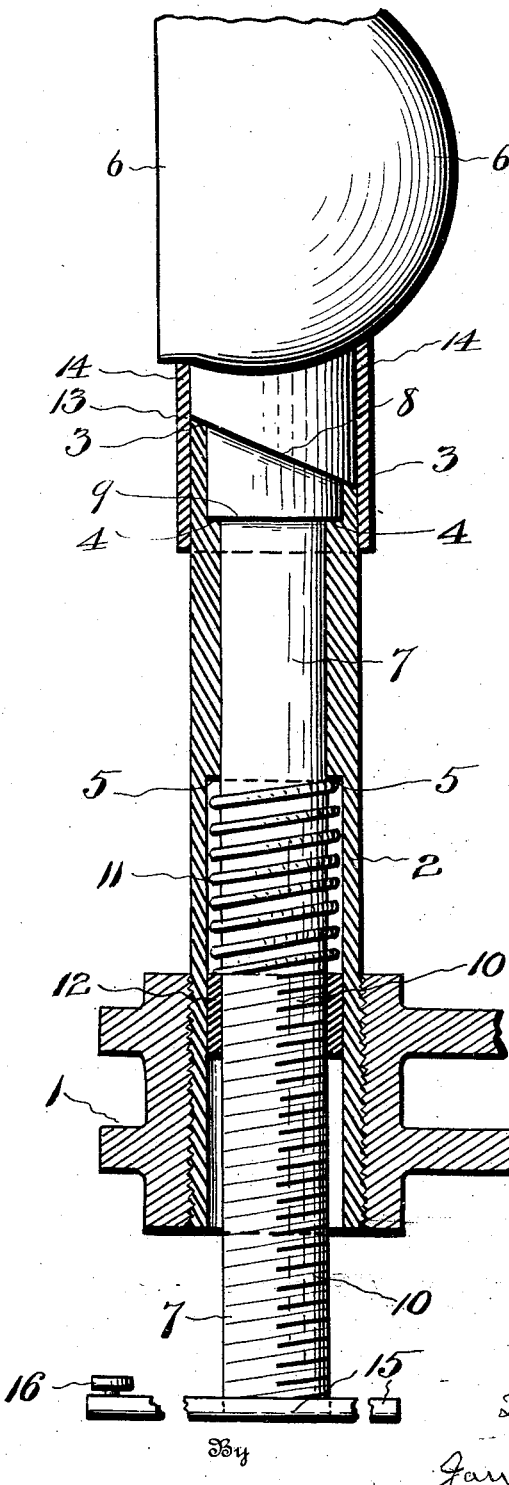
Inventor:
Lewis R. Ewart,
By James K. Polk
Attorney

UNITED STATES PATENT OFFICE.

LEWIS R. EWART, OF CODY, WYOMING.

HEADLIGHT-CONTROLLER FOR VEHICLES.

1,265,894.  Specification of Letters Patent.  Patented May 14, 1918.

Application filed April 24, 1917. Serial No. 164,110.

*To all whom it may concern:*

Be it known that I, LEWIS R. EWART, a citizen of the United States, residing at Cody, in the county of Park and State of Wyoming, have invented certain new and useful Improvements in Headlight-Controllers for Vehicles, of which the following is a specification.

My invention relates to headlight controllers for vehicles, and more particularly to headlight controllers for automobiles.

The invention consists in the several features and in the construction and arrangement of the several features, as more particularly hereinafter described and claimed.

The object of the invention is to provide automobile headlights with means by which, after they have been turned laterally to one side or the other, they will automatically be returned to their normal positions, facing straight ahead.

A further object of my invention is to provide automobile headlights with means whereby all rattling will be eliminated between the several parts, and especially between the headlight shaft or post and the tube, in which it is mounted.

A further object of my invention is to provide an automobile headlight controller which has a minimum number of parts and a maximum amount of strength to withstand wear and tear.

A still further object of my invention is to provide an automobile headlight controller which is simple, inexpensive, and durable in construction, and easy and effective in operation.

Referring to the drawings, the figure is a central longitudinal section of my improved device.

In the drawing, 1 represents a portion of a tubular internally screw-threaded bracket, adapted to be fixed to the frame of an automobile or other vehicle, 2 a sleeve externally screw threaded at its lower end and mounted in the bracket 1 and provided at its upper end with an inclined edge 3 and below the edge with a shoulder 4 and still farther down with a shoulder 5.

The headlight or lamp 6 is of the usual style and is supported on a vertical shaft or post 7, which has an inclined shoulder 8, which bears and is seated on the inclined edge 3 of the sleeve 2, and a horizontal shoulder 9 which bears and is seated on the shoulder 4 of the sleeve 2. The lower portion of the shaft or post 7 is provided with screw threads 10, and a strong spiral spring 11 surrounds the shaft or post and abuts and bears against the shoulder 5 of the sleeve 2 at its upper end and its lower end bears and is seated on an interiorly screw-threaded nut 12, mounted on the screw-threaded portion 10 of the shaft 7. This nut is for the purpose of forming a seat for the spiral spring 11 and also for regulating the tension of the spiral spring and thereby regulating the fit or tightness of the joint between the inclined edge of the sleeve and the inclined shoulder of the shaft or post.

In order to render the joint formed at the meeting point 13 of the upper inclined edge of the sleeve 2 and the inclined shoulder of the shaft or post 7 dust proof and also avoid lateral motion of the lamp, a sleeve 14 is provided, which depends from the lamp 1 and closely fits the exterior surface of the sleeve 2 and extends beyond the meeting point 13 some distance.

An arm 15 is attached to the lower end of the shaft or post 7 and is adapted to be connected to any suitable means connected to the steering-gear.

In operation, when the lamp is turned to one side or the other by the operating mechanism employed for turning the same the inclined shoulder 8 of the shaft or post 7 will ride up on the inclined upper edge 3 of the sleeve 2, against the pressure of the spring 11, and as soon as the operating mechanism is released the pressure of the spring will automatically cause the lamp to return to its normal position directed straight ahead.

The operation is so obvious that a further description of the same is not thought necessary.

Having thus described my invention, what I claim is—

1. In a headlight-controller, a sleeve provided with an inclined upper edge and upper and lower interior shoulders, a shaft carrying a headlight provided with a depending sleeve, said shaft provided with an inclined shoulder adapted to engage the inclined upper edge of the sleeve, an additional straight shoulder to seat on the upper internal shoulder of the sleeve, a spring adapted to bear on the lower shoulder of the sleeve, a screw-nut on said shaft on which said spring is seated, and said nut adapted to adjust the tension of the said spring.

2. In a headlight-controller, a bracket, a sleeve having a screw-threaded portion adapted to engage said bracket, an inclined upper edge and upper and lower shoulders, an externally-screw-threaded shaft carrying a headlight, provided with a depending sleeve, an inclined shoulder adapted to engage the inclined edge of the sleeve, and a shoulder to engage the upper shoulder of the sleeve, a spring engaging the lower shoulder of the sleeve, and a screw-nut mounted on the screw-threads of the headlight-shaft on which said spring is seated, said nut adapted to be adjusted on said shaft to regulate the tension of the spring.

In testimony whereof I affix my signature in the presence of two witnesses.

LEWIS R. EWART.

Witnesses:
R. H. EWART,
FRED R. PEARSON.